(12) United States Patent
Wu et al.

(10) Patent No.: US 9,180,917 B1
(45) Date of Patent: Nov. 10, 2015

(54) SUPPLEMENTAL SUPPORT FLANGE FOR A VEHICLE FRAME PILLAR AND EXPANDED DAYLIGHT OPENING OF PANORAMIC SUNROOF

(71) Applicant: Ford Global Technologies, LLC, Dearborn, MI (US)

(72) Inventors: Fubang Wu, Woodhaven, MI (US); Mohammed Omar Faruque, Ann Arbor, MI (US); Rick H. Wykoff, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/474,753

(22) Filed: Sep. 2, 2014

(51) Int. Cl.
| | | |
|---|---|---|
| *B60J 7/043* | (2006.01) | |
| *B62D 25/04* | (2006.01) | |
| *B62D 27/02* | (2006.01) | |

(52) U.S. Cl.
CPC ............ *B62D 27/023* (2013.01); *B60J 7/043* (2013.01); *B62D 25/04* (2013.01)

(58) Field of Classification Search
CPC ........ B60J 7/08; B62D 25/0825; B62D 25/06
USPC .................. 296/215, 203.03, 193.06, 210, 296/216.06–216.08
See application file for complete search history.

(56) References Cited

U.S. PATENT DOCUMENTS

| | | | | |
|---|---|---|---|---|
| 3,016,263 | A * | 1/1962 | Rehmann | 296/216.04 |
| 6,481,788 | B1 * | 11/2002 | Moriyama et al. | 296/216.07 |
| 7,731,275 | B2 * | 6/2010 | Bergmiller et al. | 296/216.08 |
| 7,914,072 | B2 * | 3/2011 | Queener et al. | 296/210 |
| 8,382,197 | B2 * | 2/2013 | Eberlein | 296/193.06 |
| 8,613,467 | B2 * | 12/2013 | Tanaka et al. | 280/730.2 |
| 2005/0029839 | A1 * | 2/2005 | Stemmer | 296/215 |

FOREIGN PATENT DOCUMENTS

| | | |
|---|---|---|
| CN | 101695897 | 4/2010 |
| DE | 102010031774 | 3/2011 |
| JP | 2009119925 | 6/2009 |
| JP | 2009137420 | 6/2009 |
| KR | 20090020801 | 2/2009 |

* cited by examiner

*Primary Examiner* — Dennis H Pedder
(74) *Attorney, Agent, or Firm* — Jason Rogers; Price Heneveld LLP

(57) ABSTRACT

A vehicle panoramic sunroof assembly includes a vehicle frame including a medial pillar that extends vertically from a lower frame portion to a longitudinal member of a roof frame portion. A top portion of the medial pillar includes a supplemental support flange. A panoramic sunroof frame is set within and connected to the longitudinal member of the roof frame portion and connected to the supplemental support flange. The supplemental support flange is mechanically connected to the panoramic sunroof frame.

20 Claims, 4 Drawing Sheets

SUPPLEMENTAL SUPPORT FLANGE FOR A VEHICLE FRAME PILLAR AND EXPANDED DAYLIGHT OPENING OF PANORAMIC SUNROOF

FIELD OF THE INVENTION

The present invention generally relates to vehicle frame members, and more specifically, a modified supplemental support flange for a vehicle pillar disposed at the frame for a panoramic sunroof.

BACKGROUND OF THE INVENTION

Various automobile designs include panoramic sunroofs disposed within portions of the vehicle roof. The panoramic sunroof can include a roof module that is set within the vehicle roof frame. The panoramic sunroof module includes a substantial outer frame that extends around the perimeter of the module. Typically, the panoramic sunroof module is adhered to the vehicle roof frame along a single joint that extends around the perimeter of the panoramic sunroof module.

SUMMARY OF THE INVENTION

According to one aspect of the present invention, a vehicle panoramic sunroof assembly includes a vehicle frame having a medial pillar that extends vertically from a lower frame portion to a longitudinal member of a roof frame portion. A top portion of the medial pillar includes a supplemental support flange. A panoramic sunroof frame is set within and connected to the longitudinal member of the roof frame portion and also connected to the supplemental support flange. The supplemental support flange is mechanically connected to the panoramic sunroof frame.

According to another aspect of the present invention, a vehicle panoramic sunroof assembly includes a vehicle frame having a medial pillar that extends upward to support a perimeter roof frame, and a panoramic sunroof frame set within and connected to the perimeter roof frame. A central attachment flange extends from an end of the medial pillar and extends beyond the perimeter roof frame and directly engages the panoramic sunroof frame.

According to another aspect of the present invention, a vehicle panoramic sunroof assembly includes a perimeter roof frame and a supporting medial pillar that extends downward from a longitudinal member of the perimeter roof frame. A panoramic sunroof frame is disposed within and is partially supported by the perimeter roof frame. A supplemental support flange extends from the medial pillar, under the perimeter roof frame and into direct engagement with a side member of the panoramic sunroof frame.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
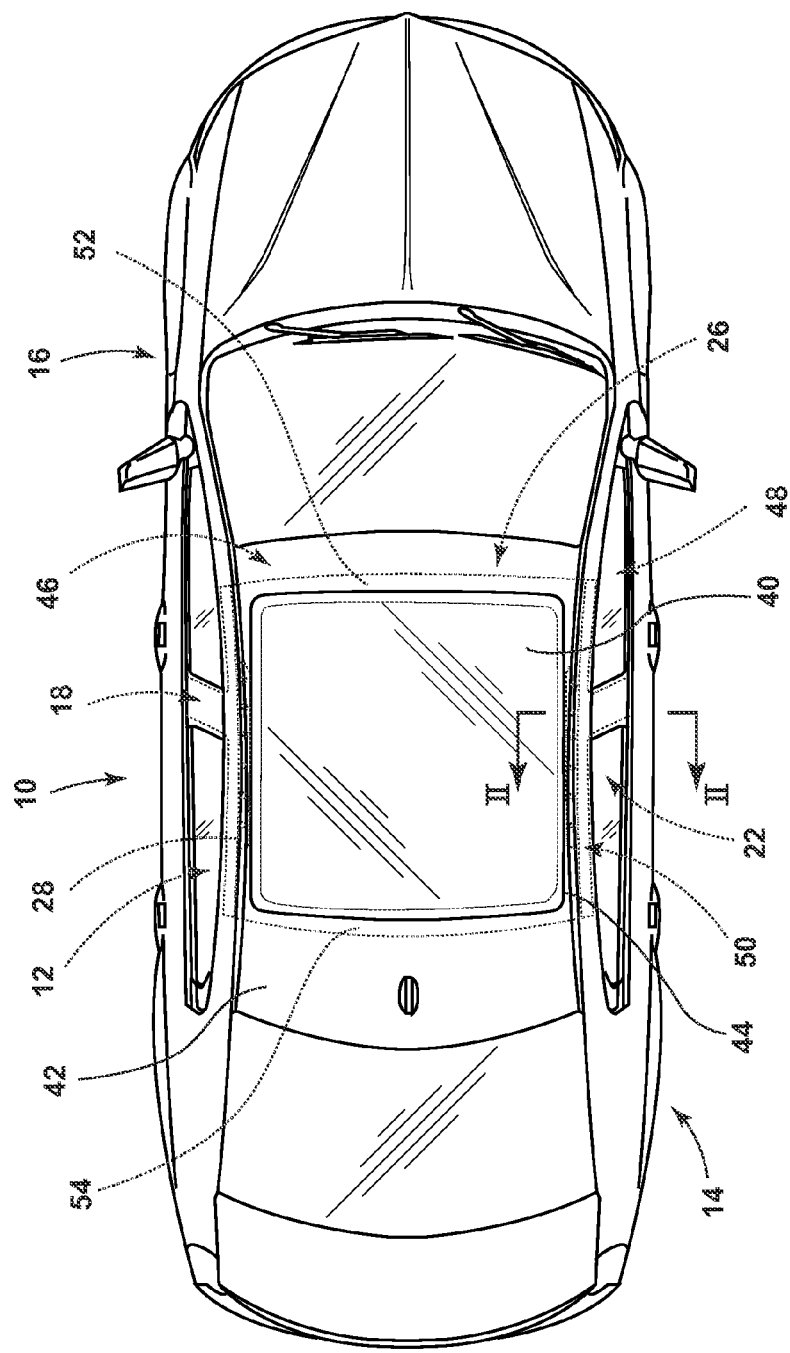
FIG. 1 is a top plan view of a vehicle incorporating an embodiment of the supplemental pillar support flange.
Figure 2:
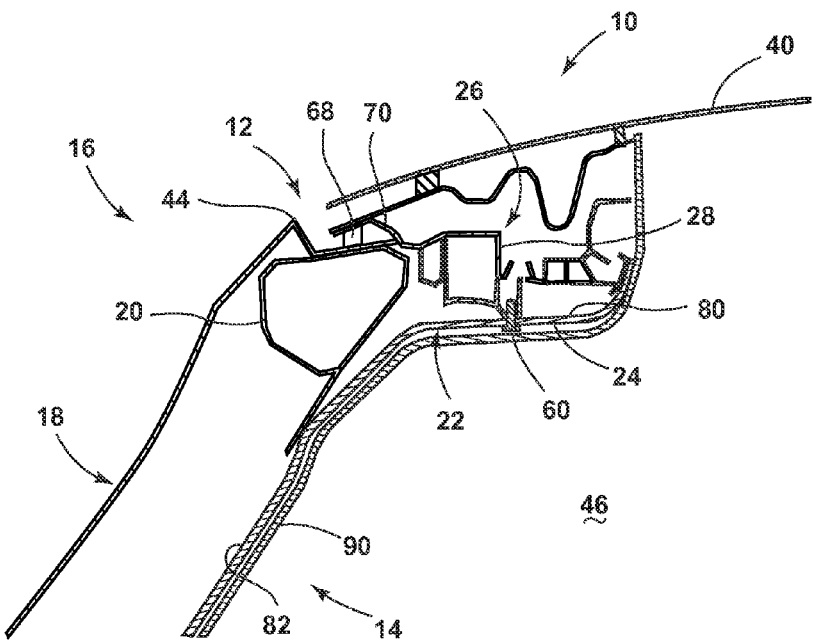
FIG. 2 is a cross-sectional view of the embodiment of the supplemental pillar support flange of FIG. 1 taken along line II-II.
Figure 3:
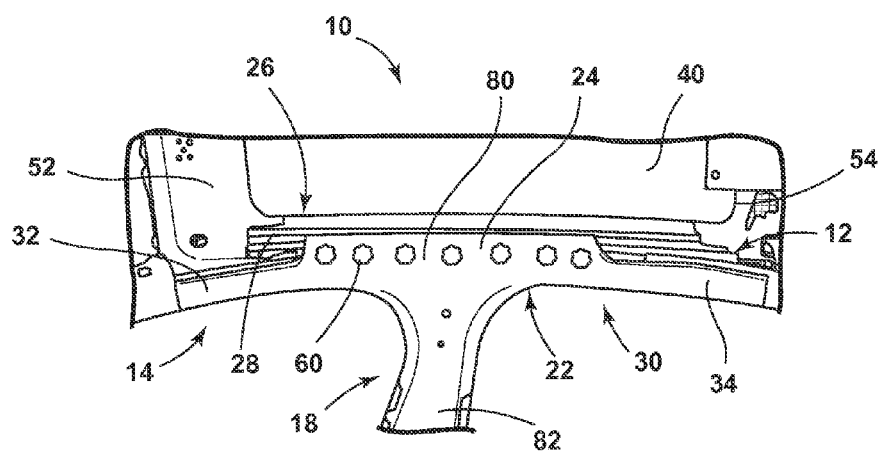
FIG. 3 is a bottom plan view of a panoramic sunroof module and vehicle frame incorporating another embodiment of the supplemental pillar support flange.
Figure 4:
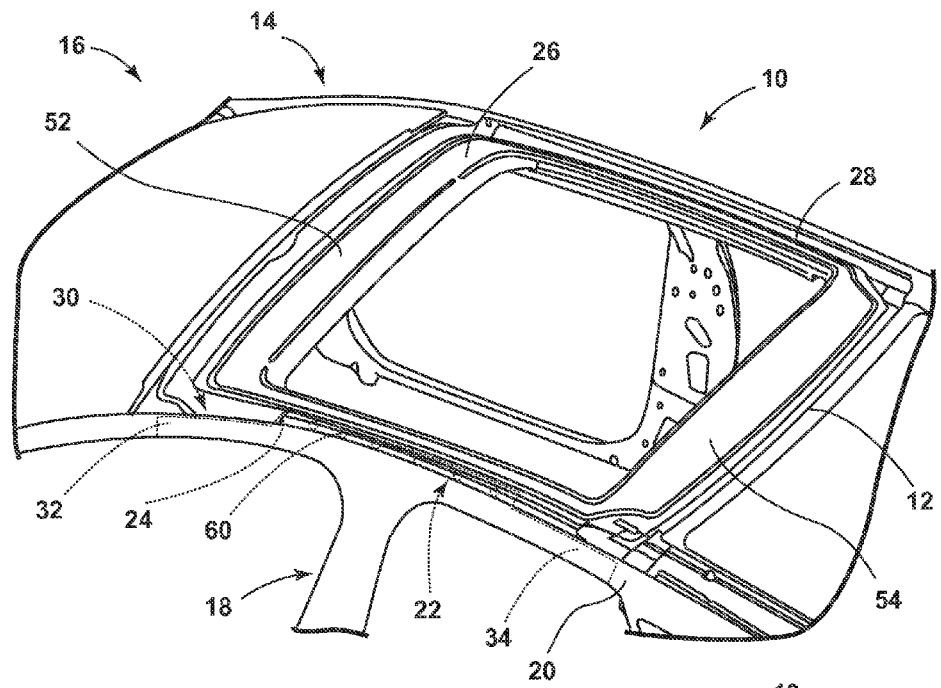
FIG. 4 is a top perspective view of the panoramic sunroof module and vehicle frame of FIG. 3.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-4, reference numeral 10 generally refers to a vehicle panoramic sunroof assembly 10 installed within a roof frame portion 12 of a vehicle frame 14 for a vehicle 16, according to one embodiment. The vehicle panoramic sunroof assembly 10 includes a vehicle frame 14 having a medial pillar 18 that extends vertically from a lower frame portion (not shown) to a longitudinal member 20 of the roof frame portion 12. A top portion 22 of the medial pillar 18 includes a supplemental support flange 24. A panoramic sunroof frame 26 is set within and is connected to the longitudinal member 20 of the roof frame portion 12. The panoramic sunroof frame 26 is also connected to the supplemental support flange 24, wherein the supplemental support flange 24 is mechanically connected to a side rail 28 of the panoramic sunroof frame 26. According to various embodiments, a lateral flange 30 extends outward from the supplemental support flange 24 and extends substantially perpendicular to the medial pillar 18. It is contemplated that the lateral flange 30 can include a forward flange 32 and an opposing rearward flange 34 connected to the longitudinal member 20 of the roof frame portion 12, and wherein the forward and rearward flanges 32, 34 cooperatively extend substantially the length of the longitudinal member 20 of the roof frame portion 12.

Referring again to FIGS. 1-4, the vehicle panoramic sunroof assembly 10 can include a glazing member 40 disposed within the roof 42 of the vehicle 16 and extends substantially to the outer lateral edges 44 of the roof 42 of the vehicle 16. Additionally, the glazing member 40 of the vehicle panoramic sunroof assembly 10 can extend over multiple portions of the passenger cabin 46 including the front row and rear row seating 48, 50. The panoramic nature of the vehicle panoramic sunroof assembly 10 requires that the panoramic sunroof frame 26 include a substantial structure along the front, rear and side rails 52, 54, 28 of the panoramic sunroof frame 26 in order to carry the weight of the glazing member 40. The substantial panoramic sunroof frame 26 also provides sufficient structural integrity to the vehicle frame 14 along the roof frame portion 12, such that the panoramic sunroof frame 26 can substantially withstand impact forces from various collisions. Such conditions can include, but are not limited to, side collisions, crush-type collisions, front collisions, rear collisions, and other similar collision conditions. In order to provide additional structural integrity for the panoramic sunroof frame 26, the top portion 22 of the medial pillar 18 includes the supplemental support flange 24 that extends under the longitudinal member 20 of the roof frame portion 12 of the vehicle frame 14 and extends to connect with the side rails 28 of the panoramic sunroof frame 26. In this manner, the supplemental support flange 24 is mechanically connected to the side rail 28 to provide a second point of support between the panoramic sunroof frame 26 and the roof frame portion 12 of the vehicle frame 14. In the various embodiments, the roof frame portion 12 is a perimeter roof frame that extends around the outer edges of the roof 42 of the vehicle 16.

Referring again to FIGS. 2-4, the supplemental support flange 24, or central attachment flange, and the forward and rearward flanges 32, 34 constitute a modified medial pillar bracket disposed at the top portion 22 of the medial pillar 18. Conventional medial pillars 18, sometimes referred as "B-pillars," extend to the longitudinal member 20 of the roof frame portion 12 of the vehicle frame 14, and connect with the longitudinal member 20. According to the various embodiments described herein, the supplemental support flange 24 is configured to extend beyond the longitudinal member 20 of the roof frame portion 12 to mechanically connect with a portion of the panoramic sunroof frame 26, such as the side rail 28. It is contemplated that the supplemental support flange 24 can connect with other portions of the panoramic sunroof frame 26, so long as the supplemental support flange 24 provides structural support to a structural or load bearing portion of the panoramic sunroof frame 26.

According to the various embodiments, the mechanical joint between the supplemental support flange 24 and the panoramic sunroof frame 26 can include any one of a plurality of mechanical connections 60 that can include, but are not limited to, weld nuts, blind rivets, flow drill screws, nut and bolt connections, conventional rivets and other similar mechanical fastening mechanisms. In various embodiments, it is also contemplated that welds and/or adhesives can be used to connect the panoramic sunroof frame 26 to the supplemental support flange 24.

Referring again to FIGS. 1-4, the mechanical connection 60 between the supplemental support flange 24 and the panoramic sunroof frame 26 provides an additional connection point between the vehicle panoramic sunroof assembly 10 and the roof frame portion 12 of the vehicle frame 14. In conventional panoramic sunroofs, the panoramic sunroof frame 26 is connected to the longitudinal member 20 of the roof frame portion 12 through a bonded adhesive, wherein a portion of the panoramic sunroof frame 26 rests upon the longitudinal member 20. Generally, this bonded connection 68 is at an outer portion 70 of the panoramic sunroof frame 26. The single bonded connection 68 between the panoramic sunroof frame 26 and the longitudinal member 20 of the roof frame portion 12 can require that the panoramic sunroof frame 26 have a substantial lateral thickness of approximately 6" or more. This substantial lateral thickness decreases the permissible size of the viewable area of a conventional panoramic sunroof due to the structural requirements of the conventional panoramic sunroof. The added mechanical connection 60 between the supplemental support flange 24 and the panoramic sunroof frame 26 provides additional structural integrity beyond the bonded connection 68.

According to the various embodiments disclosed herein, the inclusion of the supplemental support flange 24 can be at an end 80 of an inner framing member 82 of the medial pillar 18, and the additional mechanical connection 60 between the supplemental support flange 24 and the panoramic sunroof frame 26 provides additional structural integrity to the panoramic sunroof frame 26. This additional mechanical connection 60 also allows the panoramic sunroof frame 26 to be built with a narrower lateral profile to provide a greater interior viewing area through the vehicle panoramic sunroof assembly 10. This additional interior viewing area provided by the additional mechanical connection 60 at the supplemental support flange 24 provides this additional viewing area without substantially diminishing the structural integrity and strength of the overall system of the vehicle panoramic sunroof assembly 10 and the roof frame portion 12 of the vehicle frame 14.

Referring again to FIGS. 3 and 4, in addition to the supplemental support flange 24, the modified medial pillar bracket includes the lateral flange 30 that can incorporate the forward and rearward flanges 32, 34 that extend substantially the length of the longitudinal member 20 of the roof frame portion 12. In this manner, the forward and rearward flanges 32, 34 can attach directly to the longitudinal member 20 by various connection methods that can include, but are not limited to, adhesives, welds, mechanical fasteners, and other similar fastening mechanisms. The inclusion of the forward and rearward flanges 32, 34 provides additional structural integrity to the roof frame portion 12 of the vehicle frame 14 and also serves to distribute the load placed upon the supplemental support flange 24 throughout the length of the longitudinal member 20. Accordingly, the supplemental support flange 24, which can extend laterally beyond each of the forward and rearward flanges 32, 34 to engage the panoramic sunroof frame 26, receives at least a portion of the vertical load from the panoramic sunroof frame 26. The load received by the supplemental support flange 24 is then distributed down the modified medial pillar bracket and along the forward and rearward flanges 32, 34 to be distributed into the longitudinal member 20 of the roof frame portion 12 of the vehicle frame 14. Accordingly, the various loads exerted upon the supplemental support flange 24 can be transferred to the longitudinal member 20 of the roof frame portion 12. It is also contemplated that a portion of the load exerted by the panoramic sunroof frame 26 upon the supplemental support flange 24 can be carried by at least a portion of the remainder of the medial pillar 18 to further distribute the various loads of the vehicle panoramic sunroof assembly 10 throughout the vehicle frame 14.

According to the various embodiments, the inclusion of the additional attachment point between the supplemental support flange 24 and the panoramic sunroof frame 26 can allow for the use of thinner and lighter structural members within the panoramic sunroof frame 26 to decrease the weight of the vehicle panoramic sunroof assembly 10 and the vehicle 16 as a whole. Moreover, the additional mechanical attachment points located at the supplemental support flange 24 have been shown to increase the safety performance of the vehicle 16 within areas of the vehicle frame 14 that incorporate various embodiments of the vehicle panoramic sunroof assembly 10 and the supplemental support flange 24. Such improvements in the performance of the vehicle frame 14 can include a reduction in the intrusion velocity of portions of the roof frame portion 12 during various impact conditions. The increased safety performance of the vehicle frame 14 is achieved while using less material within the panoramic sunroof frame 26. The decrease in material is achieved through using a narrower profile at the side rails 28 of the panoramic sunroof frame 26 and also through using narrower gauge material within the various components of the panoramic sunroof frame 26. The narrower profile can be defined by a cross-sectional width of the members of the panoramic sunroof frame 26, including the side rails 28 taken through the supplemental support flange 24 being approximately 3" or less. As discussed above, the ability to use a narrower frame and framing members with a decreased gauge are provided through the use of the supplemental support flange 24 and the mechanical connection 60 between the supplemental support flange 24 and the panoramic sunroof frame 26. Additionally, this increased performance is provided through the use of the forward and rearward flanges 32, 34 that extend outward from the supplemental support flange 24.

According to various embodiments, it is contemplated that the forward and rearward flanges 32, 34 of the modified medial pillar bracket can be configured to have the same lateral thickness as the supplemental support flange 24. In such an embodiment, the forward and rearward flanges 32, 34 can be configured to engage both the longitudinal member 20 and the panoramic sunroof frame 26 to provide additional structural integrity. It is also contemplated that the supplemental support flange 24 can extend from an end portion of one or more of the other pillars of the vehicle frame 14, including, but not limited to, the A-pillar, the C-pillar, respectively, or other pillar within the vehicle frame 14 that is disposed proximate a portion of a vehicle panoramic sunroof assembly 10 disposed within the roof 42 of the vehicle 16. In the various embodiments where the supplemental support flange 24 is installed within a forwardmost or rearwardmost pillar of the vehicle frame 14, such as the A-pillar or C-pillar, respectively, within a sedan-type vehicle, the lateral flange 30 that extends outward from the supplemental support flange 24 may include only the rearward flange 34 in the case of an A-pillar supplemental support flange 24 or, alternatively, a forward flange 32 in the case of a C-pillar supplemental support flange 24.

Referring again to FIG. 2, it is contemplated that the interior paneling 90 of the vehicle 16 can be used to conceal various portions of the supplemental support flange 24, as well as the mechanical connections 60 between the supplemental support flange 24 and the panoramic sunroof frame 26. Additionally, a supplemental support flange 24 can be used as an attachment point for various fixtures disposed within the interior paneling 90 of the vehicle 16. Such interior fixtures can include, but are not limited to, handles, hooks, light fixtures, HVAC fixtures, and other similar interior fixtures disposed throughout the passenger compartment of the vehicle 16.

Figure 5:
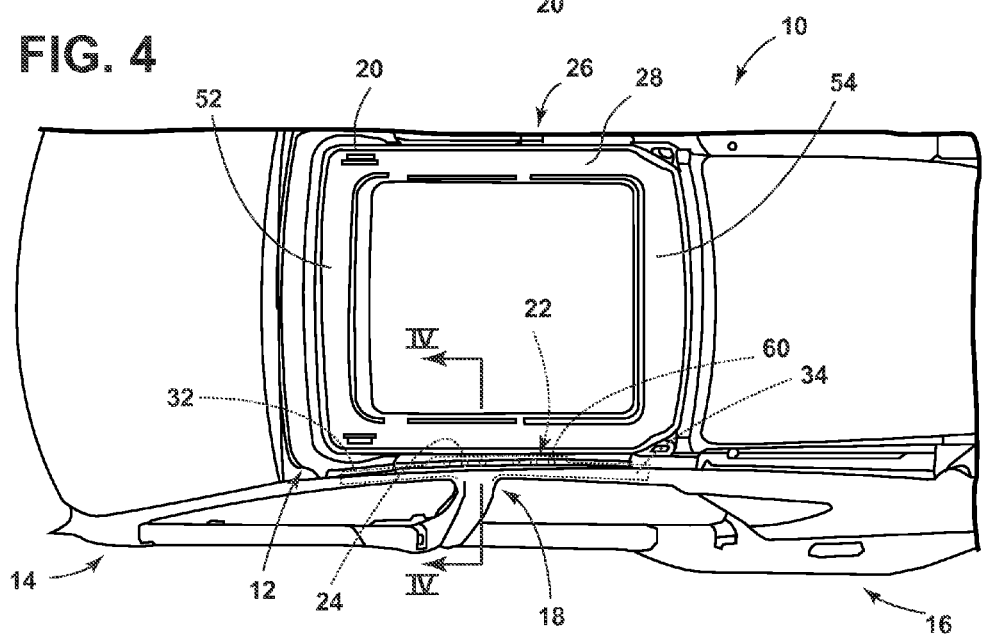
FIG. 5 is a top plan view of a panoramic sunroof module and vehicle frame incorporating another alternate embodiment of the supplemental pillar support flange.
Figure 6:
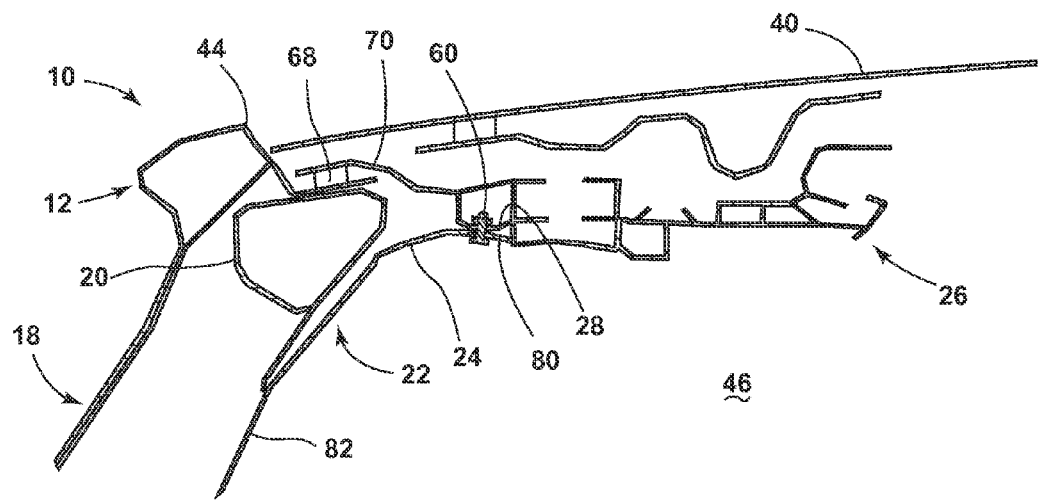
FIG. 6 is a cross-sectional view of the panoramic sunroof module and vehicle frame of FIG. 5 taken along line VI-VI.
Figure 7:
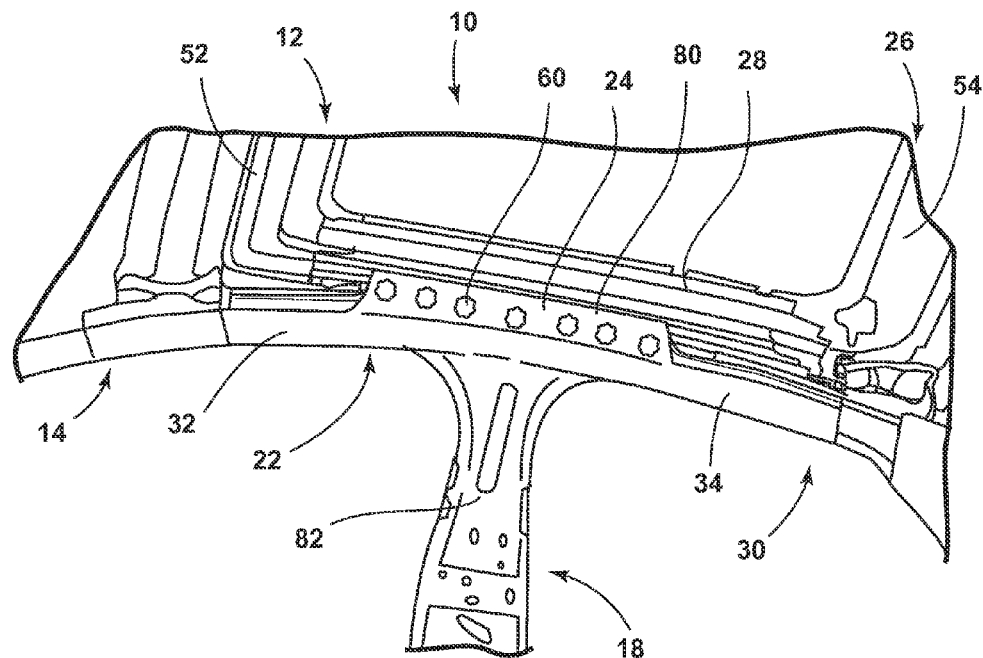
FIG. 7 is a bottom plan view of the panoramic sunroof module and vehicle frame of FIG. 5.

Referring now to FIGS. 5-7, it is contemplated that various vehicles may be designed such that a laterally wider frame of the vehicle panoramic assembly is desired. In such cases, a supplemental support flange 24 can be adapted to extend under only a portion of the panoramic sunroof frame 26 to engage a side rail 28 or other portion of the panoramic sunroof frame 26. According to the various embodiments, the supplemental support flange 24, as discussed above, is attached to the panoramic sunroof frame 26, via a series of mechanical connections 60. Additionally, the forward and rearward flanges 32, 34 that extend outward from the supplemental support flange 24 are adapted to connect at least with the longitudinal member 20 of the roof frame portion 12 of the vehicle frame 14. In this manner, similar to the embodiments described above, various loads from the panoramic sunroof frame 26 are received by the supplemental support flange 24 and transferred through the modified medial pillar bracket to the remainder of the medial pillar 18 as well as through the forward and rearward flanges 32, 34 to be transferred into the longitudinal member 20 of the roof frame portion 12 of the vehicle frame 14. In vehicle designs requiring a laterally deeper panoramic sunroof frame 26, it is contemplated that various embodiments of the supplemental support flange 24 can extend beneath the entire width of the panoramic sunroof frame 26.

According to the various embodiments, it is contemplated that the top portion 22 of the medial pillar 18 that includes the supplemental support flange 24 and the forward and rearward flanges 32, 34 can be a separate member that is attached to the inner framing member 82 of the medial pillar 18. In various alternate embodiments, the forward and rearward flanges 32, 34 and the supplemental support flange 24 can be integrally formed as part of the inner framing member 82 of the medial pillar 18. It is further contemplated that the supplemental support flange 24 and the forward and rearward flanges 32, 34 of the medial pillar 18 can be made of various materials that can include, but are not limited to, steel, aluminum, sheet metal, alloys thereof, combinations thereof, and other similar materials that can be used as portions of a vehicle frame 14.

Referring again to FIGS. 1-7, the various mechanical connections 60 used to fasten a supplemental support flange 24 to the panoramic sunroof frame 26 can include a predetermined distance or spacing between one another to evenly distribute the load from the panoramic sunroof frame 26, onto the supplemental support flange 24. It is contemplated that the predetermined distance between the mechanical fasteners can be within the range of about 70 mm to about 90 mm, and more particularly, about 80 mm. It is contemplated that the predetermined distance between the mechanical connections 60 at the supplemental support flange 24 can be greater than or less than the stated ranges, depending upon the specific vehicle, the driving conditions intended to be experienced by the vehicle 16, the loads exerted upon the vehicle frame 14 by the vehicle panoramic sunroof assembly 10, and other various factors.

In the various embodiments, it is contemplated that certain vehicles can include multiple sunroofs that provide lighting and, in some embodiments, ventilation, to various portions of the passenger cabin 46 of vehicle 16. In such vehicle designs, it is contemplated that the roof frame portion 12 of the vehicle frame 14 can include multiple supplemental support flanges 24 and multiple lateral flanges 30 that extend outward from each of the supplemental support flanges 24. In such an embodiment, each supplemental support flange 24 is adapted to provide structural reinforcement for each of the vehicle panoramic sunroof assemblies 10 disposed within the roof 42 of the vehicle 16.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle panoramic sunroof assembly comprising:
a vehicle frame including a medial pillar having inner and outer framing portions that extend vertically from a lower frame portion to a longitudinal member of a roof frame portion, wherein a top portion of the inner framing member includes a supplemental support flange; and
a panoramic sunroof frame set within and connected to the longitudinal member of the roof frame portion and connected to the supplemental support flange, wherein the supplemental support flange extends under the longitudinal member and is mechanically connected to the panoramic sunroof frame, and wherein the top portion of the inner framing member and the supplemental support flange define a single member.

2. The vehicle panoramic sunroof assembly of claim 1, further comprising:
a lateral flange extending outward from the supplemental support flange and extending substantially perpendicular to the medial pillar, wherein the lateral flange further defines the top portion of the inner framing member.

3. The vehicle panoramic sunroof assembly of claim 2, wherein the lateral flange includes a forward flange and an opposing rearward flange that are connected to the longitudinal member of the roof frame portion, and wherein the forward and rearward flanges cooperatively extend substantially a length of the longitudinal member.

4. The vehicle panoramic sunroof assembly of claim 1, wherein the supplemental support flange is connected to a side rail of the panoramic sunroof frame by a plurality of mechanical connections, and wherein the supplemental support flange is not directly fastened with the longitudinal member of the roof frame portion.

5. The vehicle panoramic sunroof assembly of claim 4, wherein the mechanical connections are spaced connections set apart by a predetermined distance.

6. The vehicle panoramic sunroof assembly of claim 5, wherein the predetermined distance is in a range of approximately 70 mm to approximately 90 mm.

7. A vehicle panoramic sunroof assembly comprising:
a vehicle frame including a medial pillar that extends upward to support a perimeter roof frame;
a panoramic sunroof frame set within and connected to the perimeter roof frame; and
a central attachment flange defined in one piece with an end of an inner framing member of the medial pillar, the central attachment flange extending beyond the perimeter roof frame and directly engaging the panoramic sunroof frame.

8. The vehicle panoramic sunroof assembly of claim 7, wherein the central attachment flange is not directly fastened with the longitudinal member of the perimeter roof frame.

9. The vehicle panoramic sunroof assembly of claim 7, further comprising:
at least one laterally extending flange extending outward from the central attachment flange and extending substantially perpendicular to the medial pillar.

10. The vehicle panoramic sunroof assembly of claim 9, wherein the at least one laterally extending flange is connected to the perimeter roof frame.

11. The vehicle panoramic sunroof assembly of claim 7, wherein the central attachment flange is connected to the panoramic sunroof frame via a plurality of mechanical connections.

12. The vehicle panoramic sunroof assembly of claim 11, wherein the mechanical connections are spaced connections set apart by a predetermined distance.

13. The vehicle panoramic sunroof assembly of claim 12, wherein the predetermined distance is in a range of approximately 70 mm to approximately 90 mm.

14. A vehicle panoramic sunroof assembly comprising:
a perimeter roof frame and a supporting medial pillar extending downward from a longitudinal member of the perimeter roof frame;
a panoramic sunroof frame disposed within and partially supported by the perimeter roof frame; and
a supplemental support flange defined in one piece with a top of an inner framing member of the medial pillar, the supplemental support flange extending under the perimeter roof frame and into direct engagement with a side member of the panoramic sunroof frame.

15. The vehicle panoramic sunroof assembly of claim 14, wherein the supplemental support flange is not directly fastened with the longitudinal member of the perimeter roof frame.

16. The vehicle panoramic sunroof assembly of claim 14, further comprising:
a laterally extending flange extending outward from the supplemental support flange and extending substantially perpendicular to the medial pillar.

17. The vehicle panoramic sunroof assembly of claim 16, wherein the laterally extending flange is at least partially connected to the longitudinal member of the perimeter roof frame.

18. The vehicle panoramic sunroof assembly of claim 14, wherein the supplemental support flange is connected to the panoramic sunroof frame via a plurality of mechanical connections.

19. The vehicle panoramic sunroof assembly of claim 18, wherein the mechanical connections are spaced connections set apart by a predetermined distance.

20. The vehicle panoramic sunroof assembly of claim 14, wherein a cross-sectional width of the side member of the panoramic sunroof frame, taken through the supplemental support flange is approximately 3".

* * * * *